United States Patent [19]

Inokuchi

[11] Patent Number: 5,386,745
[45] Date of Patent: Feb. 7, 1995

[54] MOTION CONVERTING MECHANISM AND ROTARY TOOL

[75] Inventor: Mitsuhide Inokuchi, Nagoya, Japan

[73] Assignee: Tokuden Kosumo Kabushiki Kaisha, Nagoya, Japan

[21] Appl. No.: 104,477

[22] Filed: Jul. 28, 1993

Related U.S. Application Data

[63] Continuation-in-part of Ser. No. 859,520, Jun. 11, 1992, abandoned.

[51] Int. Cl.⁶ .............................................. B25B 17/00
[52] U.S. Cl. ..................................... 81/57.3; 81/58.1; 74/143
[58] Field of Search ................ 81/57.3, 57, 57.14, 81/57.31, 57.39, 57.42, 58, 58.1, 58.3, 58.4; 74/143

[56] References Cited

U.S. PATENT DOCUMENTS 5,176,038  1/1993  Inokuchi et al. ................ 81/58.1 X

*Primary Examiner*—D. S. Meislin
*Attorney, Agent, or Firm*—Dennison, Meserole, Pollack & Scheiner

[57] ABSTRACT

A motion converting mechanism according to the present invention is constructed such that pinions (10, 11) are engaged with a circular arcuate gear (8) for performing reciprocating circular arcuate motions about a pivot, and two sets of one-way clutch mechanisms (16-19) are provided in the transmission path from the pinions (10, 11) to an output shaft (1), thereby rotating the output shaft (1) in the same direction. With this arrangement, the output shaft (1) is rotated in the same direction during both forward and reverse movements of the circular arcuate gear (8).

Further, a rotary tool according to the present invention is adapted to utilize the above motion converting mechanism, and a grip portion (6) of a reciprocating pivotal member is reciprocatingly pivoted relative to a lever portion (5) of a main body, so that an output gear (4) can be rotated in the same direction, thereby rotating a work to be rotated in the same direction. With this arrangement, bolts, screws and the like can be fastened or loosened.

Futher, another motion converting mechanism according to the present invention uses a circular gear as input means, and the output shaft (1) is rotated in the same direction even when the circular gear (8) is rotated in any direction.

6 Claims, 5 Drawing Sheets 5,386,745

MOTION CONVERTING MECHANISM AND ROTARY TOOL

This application is a continuation-in-part of U.S. application Ser. No. 07/859,520, filed Jun. 11, 1992, now abandoned.

TECHNICAL FIELD

The present invention relates to a mechanism for converting a reciprocating circular arcuate motion into a rotary motion, and particularly to a rotary tool utilizing such a mechanism.

The present invention further relates to a mechanism for converting any rotary motion into a rotary motion in the same direction.

BACKGROUND ART

A conventional mechanism for converting both forward and reverse movements of a reciprocating member into a rotary motion in one direction is disclosed in Japanese Laid-Open Patent Publications Nos. 52-154964 and 58-61353.

In the conventional mechanism, pinions are engaged with racks formed on both sides of a rack member which performs reciprocating rectilinear motions, and rotary motions of the pinions are transmitted to an output shaft through respective one-way clutches, and the output shaft is rotated in one direction.

In general, such tools which develop a one-way rotation, like a ratchet type socket wrench, performs reciprocating pivotal motions by grasping a grip by hand to input reciprocating circular arcuate motions.

In the above-mentioned conventional mechanism, however, it is impossible to directly convert a reciprocating circular arcuate motion into a one-way rotary motion, and accordingly, the mechanism as it is can not be applied to tools such as ratchet type socket wrenches.

Further, in the reciprocating rectilinear motion of a rack member, the distances of forward and reverse movements are restricted and are required to be equal in principle. Thus, the conventional mechanism is not adaptable for input members of which the distance of forward or reverse movement is extremely long, or the distance of forward and reverse movements are not equal.

OBJECTS OF THE INVENTION

It is an object of the present invention to provide a mechanism for converting both forward and reverse movements of reciprocating circular arcuate motion of a circular arcuate gear into a rotary motion in the same direction.

It is another object of the present invention to provide a rotary tool utilizing such a motion converting mechanism.

It is a further object of the present invention to provide a mechanism for converting any rotary motion (as in the cases where forward and reverse rotary motions are inputted freely, or the distances of forward and reverse rotary motions are not equal) into a rotary motion in the same direction.

DISCLOSURE OF THE INVENTION (1) In accordance with the present invention, there is provided a motion converting mechanism including a circular arcuate gear provided for reciprocating circular arcuate motion about a pivot; pinions engaged with the circular arcuate gear; an output shaft provided for rotary motion; two one-way clutch mechanism provided in the transmission path from the pinions to the output shaft. The first one-way clutch mechanism is adapted to rotate idly during forward movement of the circular arcuate gear, and the second one-way clutch mechanism is adapted to rotate during reverse movement of the circular arcuate gear. The transmission path from the two one-way clutch mechanisms to the output shaft is such that the output shaft may be rotated in the same direction when either of the two one-way clutch mechanisms is engaged.

With this arrangement, the output shaft is rotated in the same direction during both forward and reverse movements of the circular arcuate gear. Thus, the motion converting mechanism of the invention can convert a reciprocating circular arcuate motion into a one-way rotary motion.

(2) One of the rotary tools embodying the present invention includes an output gear having means for transmitting rotation to a work to be rotated; a body rotatably supporting the output gear and having a lever portion formed on one end thereof; a reciprocating pivotal member mounted on the body for pivotal motion about a pivot and having a circular arcuate gear portion on one end and a grip portion on the other end, the grip portion being adapted to develop reciprocating pivotal motions for the circular arcuate gear to perform reciprocating circular arcuate motions; pinions mounted on the body and engaged with the circular arcuate gear; and two one-way clutch mechanisms provided in the transmission path from the pinions to the output shaft. The first one-way clutch mechanism is adapted to rotate idly during forward movement of the circular arcuate gear, and the second one-way clutch mechanism is adapted to rotate during reverse movement of the circular arcuate gear. The transmission path from the two one-way clutch mechanisms to the output shaft is such that the output shaft may be rotated in the same direction when either of the two one-way clutch mechanisms is engaged.

With this arrangement, the output gear can be rotated in the same direction through reciprocating pivotal motion of the grip portion of the reciprocating pivotal member relative to the lever portion of the body, and therefore, the work can be rotated in the same direction.

(3) In accordance with another aspect of the present invention, the rotary tool as described in the above (2) is characterized in that the pinions engaged with the circular arcuate gear comprises a first and a second pinion, and that the one-way clutch mechanisms and the transmission path from the one-way clutch mechanisms to the output gear comprises a first drive gear disposed coaxially with the first pinion, a first running face ratchet formed between the first pinion and the first driver gear, a second drive gear disposed coaxially with the second pinion and engaged with the first drive gear, and a second running face ratchet formed between the second pinion and the second drive gear and adapted to transmit rotation in the direction opposite to that of the first running face ratchet. The first drive gear is adapted to engage the output gear.

With this arrangement, reciprocating pivotal motions of the grip portion of the reciprocating pivotal member relative to the lever portion of the body permit the output gear to be rotated in the same direction through the transmission path such as the first and the second running face ratchets. Thus, the work can be rotated in the same direction.

(4) In accordance with still another aspect of the present invention, the rotary tool as described in the above (3) is characterized in that the first and second drive gears can be selectively engaged with the output gear.

With this arrangement, when the first or the second drive gear is brought in engagement with the output gear, rotational directions of the output gear can be inverted, thereby rotating a work in forward or reverse direction. Such change of the drive gears permits a bolt or a nut as a work to be fastened and loosened as well.

(5) In accordance with a further aspect of the present invention, a ratchet type socket wrench, which is a rotary tool as described in any one of the above (2), (3) and (4), is characterized in that the rotation transmitting means of the output gear is socket holder means for holding a socket receiving a bolt or a nut.

Thus, one-way rotation of the socket permits a bolt or a nut to be fastened or loosened.

(6) In accordance with a still further aspect of the present invention, a motion converting mechanism includes a circular gear (in a normal round shape), pinions engaged with the circular gear, an output shaft provided for rotary motion, and two one-way clutch mechanisms provided in the transmission path from the pinions to the output shaft. The first one-way clutch mechanism is adapted to rotate idly during forward movement of the circular gear, and the second one-way clutch mechanism is adapted to rotate during reverse movement of the circular gear. The transmission path from the two one-way clutch mechanisms to the output shaft is such that the output shaft may be rotated in the same direction when either of the two one-way clutch mechanisms is engaged.

This mechanism permits the output shaft to rotate in the same direction even in the cases that the circular gear rotates in any direction, for example, three times consecutively in one direction and then one time in the other, or indefinitely in one direction.

PREFERRED EMBODIMENT

Figure 1:
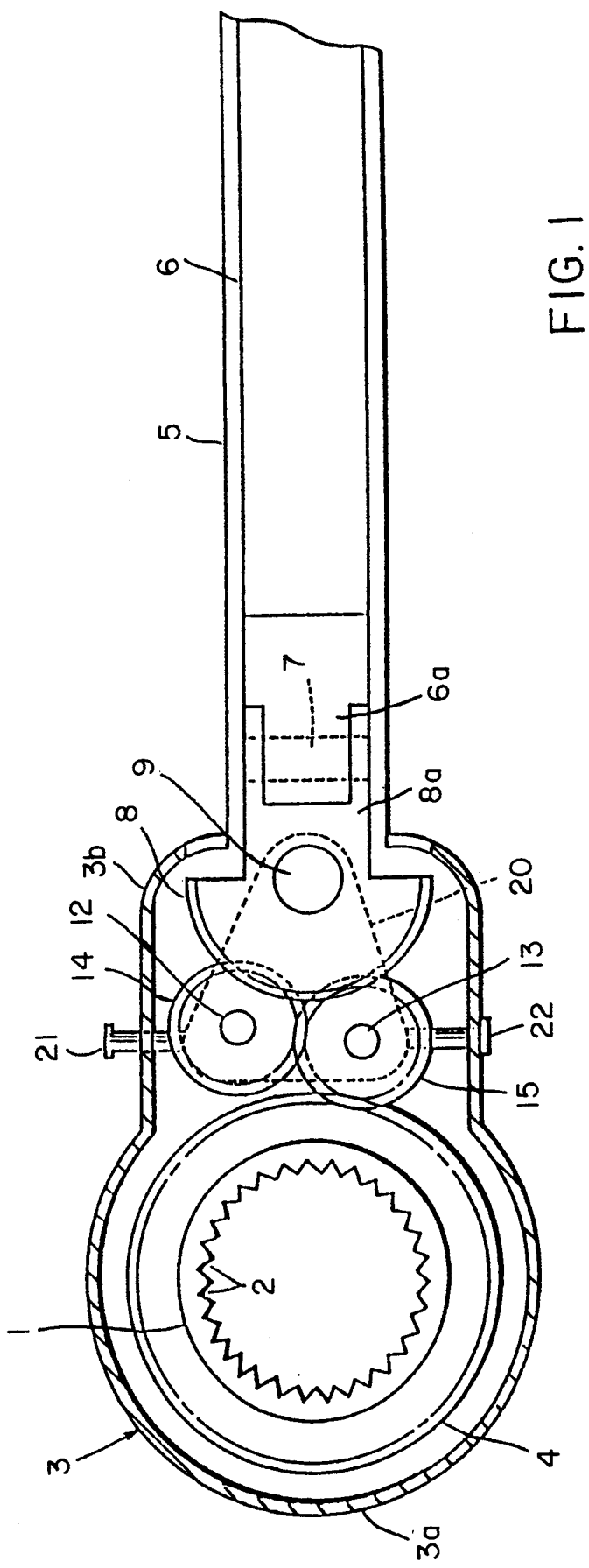
FIG. 1 is a plan view showing construction of an embodiment in accordance with the present invention.
Figure 2:
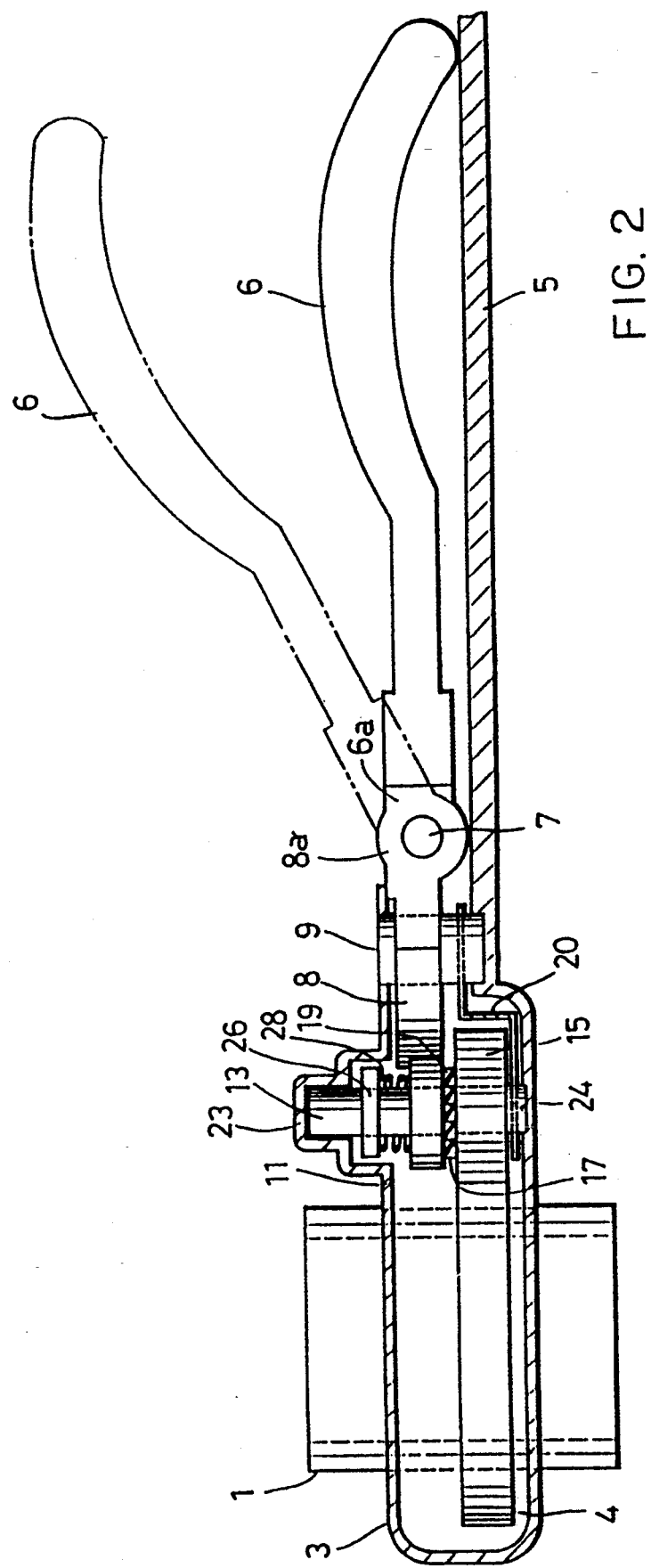
FIG. 2 is a sectional view of FIG. 1.

FIG. 1 is a plan view showing construction of an embodiment of a mechanism for converting a reciprocating circular arcuate motion into a rotary motion according to the present invention, and FIG. 2 is a sectional view thereof. In the embodiment, the principle of the invention is applied to a ratchet type socket wrench.

In the present embodiment, an output shaft 1 mounted for rotary motion is of a cylindrical shape and has splines 2 formed on the inner periphery thereof, in the vertical direction in FIG. 2, for attachment of a socket (not shown) to receive a bolt or a nut or the like.

As shown in FIG. 2, the output shaft 1 is supported rotatably on the center of a casing 3, with its upper and lower parts projecting out of the casing 3. An output gear 4 is mounted on the outer periphery of the output shaft 1. The casing 3 is composed of a round part 3a for enclosing the output gear 4 and a square part 3b extending behind the round part 3a (to the right as seen in FIG. 2). A rule-shaped lever 5 linearly extends from the rear end of the bottom of the square part 3b.

A grip 6 is disposed on the upper surface of the lever 5. The grip 6 is slightly narrower than the lever 5 in width and is gently curved upwardly. The front end 6a of the grip 6 is connected to the rear end 8a of a circular arcuate gear 8 by a connecting bar 7, to permit pivotal motion of the grip 6 in the vertical direction.

The circular arcuate gear 8 is a semi-circular gear and is mounted rotatably on a rotary shaft 9 provided on the rear end of the square part 3b of the casing 3. Pinions 10, 11 (not numbered in FIGS. 1 and 5, numbered in FIG. 3) engageable with the circular arcuate gear 8 are enclosed in the front part of the square part 3b. Driver gears 14, 15 are arranged under the pinions 10, 11 coaxially in layers, respectively. The drive gears 14, 15 are secured to shafts 12, 13 disposed centrally thereof, while the pinions 10, 11 are loosely and rotatably fitted on the shafts 12, 13.

Figures 3, 4:
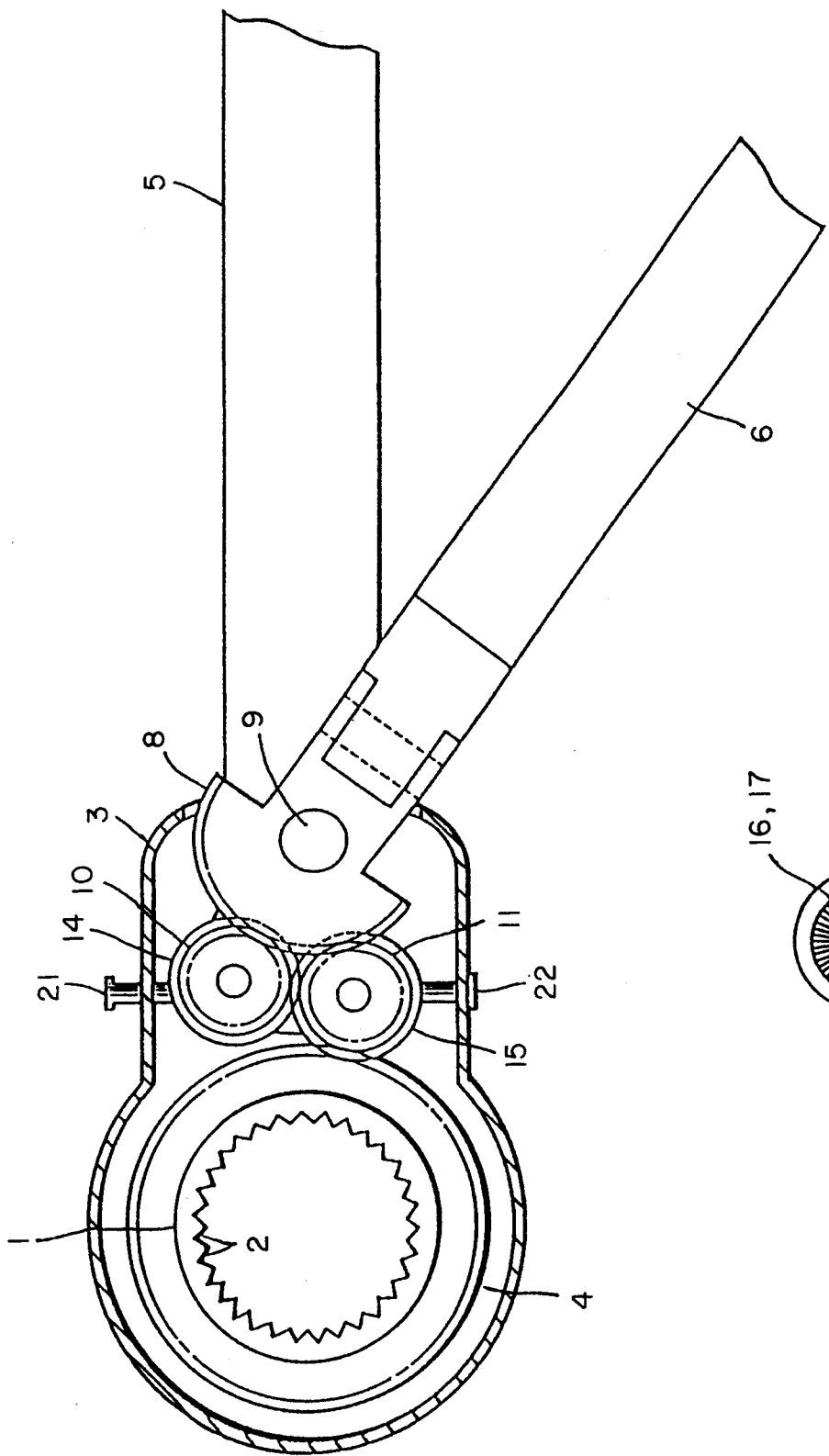
FIG. 3 is a plan view of the embodiment showing a grip in a pivoted position.
FIG. 4 is a plan view of a drive gear incorporated in the embodiment.

As shown in FIG. 4, each of the drive gears 14, 15 has an upper surface formed with a plurality of wedge-shaped clutch teeth 16, 17 arranged in rings. The clutch teeth 16, 17 are inclined in the same direction. Each of the pinions 10, 11 has a lower surface formed with clutch teeth 18, 19 which are so configured as to be engaged with the clutch teeth 16, 17. In FIG. 2, the clutch teeth 17 of the left drive gear 15 (here the upper and the lower side as seen in FIG. 2 is referred to as the right and the left, respectively) is in engagement with the clutch teeth 19 of the left pinion 11. Similarly, though not shown, the clutch teeth 16 of the right drive gear 14 is in engagement with the clutch teeth 18 of the pinion 10. The inclination of the clutch teeth 16, 18 is opposite to that of the clutch teeth 17, 19 shown in FIG. 2. These clutch teeth 16, 17, 18, 19 serve to transmit rotary motion during rotation in a direction in which they are engaged, but they ride across the corresponding inclined surfaces during rotation in the opposite direction and cause idle rotation, thus constituting a kind of one-way clutch mechanism which may be called "running face ratchet".

Figure 6:
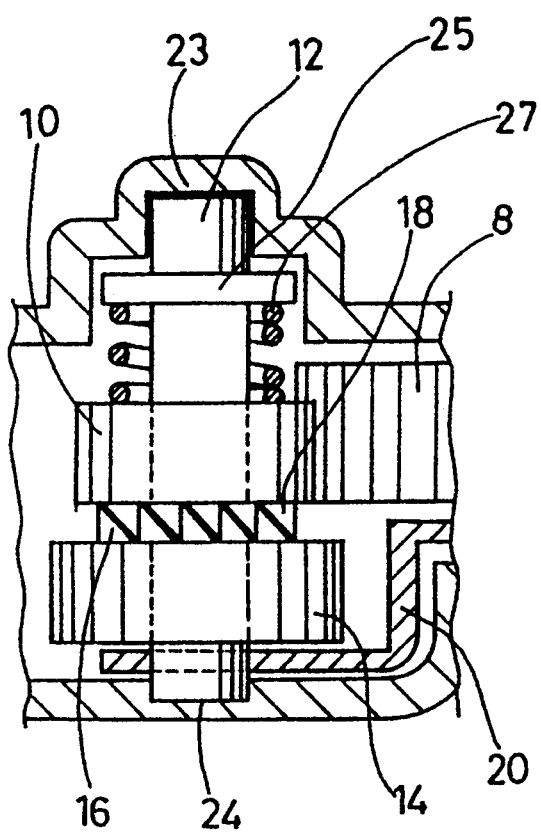
FIG. 6 is a sectional view of one of one-way clutch mechanisms other than that shown in FIG. 2.

As shown in FIGS. 2 and 6, collars 25 and 26 are integrally formed with the upper portions of the shafts 12 and 13, respectively. Compression coil springs 27 and 28 are interposed between the collar 25 of the shaft 12 and its corresponding pinion 10 and between the collar 26 of the shaft 13 and the corresponding pinion 11, respectively, so that the compression coil springs 27 and 28 normally bias pinions 10 and 11 in a downward direction, respectively. Thus, the clutch teeth 18 formed on the lower surface of the pinion 10 is forced toward the clutch teeth 16 formed on the upper surface of the drive gear 14, and the clutch teeth 19 formed on the lower surface of the pinion 11 is forced toward the clutch teeth 17 formed on the upper surface of the drive gear 15.

Because of the biasing forces of the compression coil springs 27 and 28, the clutch teeth 18 and 19 are kept in engagement with their corresponding clutch teeth 16 and 17, respectively, so as to reliably transmit rotation when the pinions 10 and 11 are rotated in one direction, respectively. When the pinions 10 and 11 are rotated in the opposite direction, the pinions 10 and 11 are lifted against the biasing forces of the compression springs 27 and 28, respectively, through cooperation of the inclined surfaces of the clutch teeth 18 with those of the clutch teeth 19 and through cooperation of the inclined surfaces of the clutch teeth 16 with those of the clutch teeth 17. Thus, the rotation of the pinions 10 and 11 is not transmitted to the drive gears 14 and 15, respectively.

As shown in FIG. 1, each of the shafts 12, 13 is rotatably supported on two corners of a triangle plate 20 which can pivot about the rotary shaft 9 of the circular arcuate gear 8. The upper and lower ends of the shafts 12, 13 are slidably fitted in circular arcuate grooves 23, 24 formed on an upper and a lower internal surface of the square part 3b and having a width equal to the diameter of the shafts 12, 13.

Figure 5:
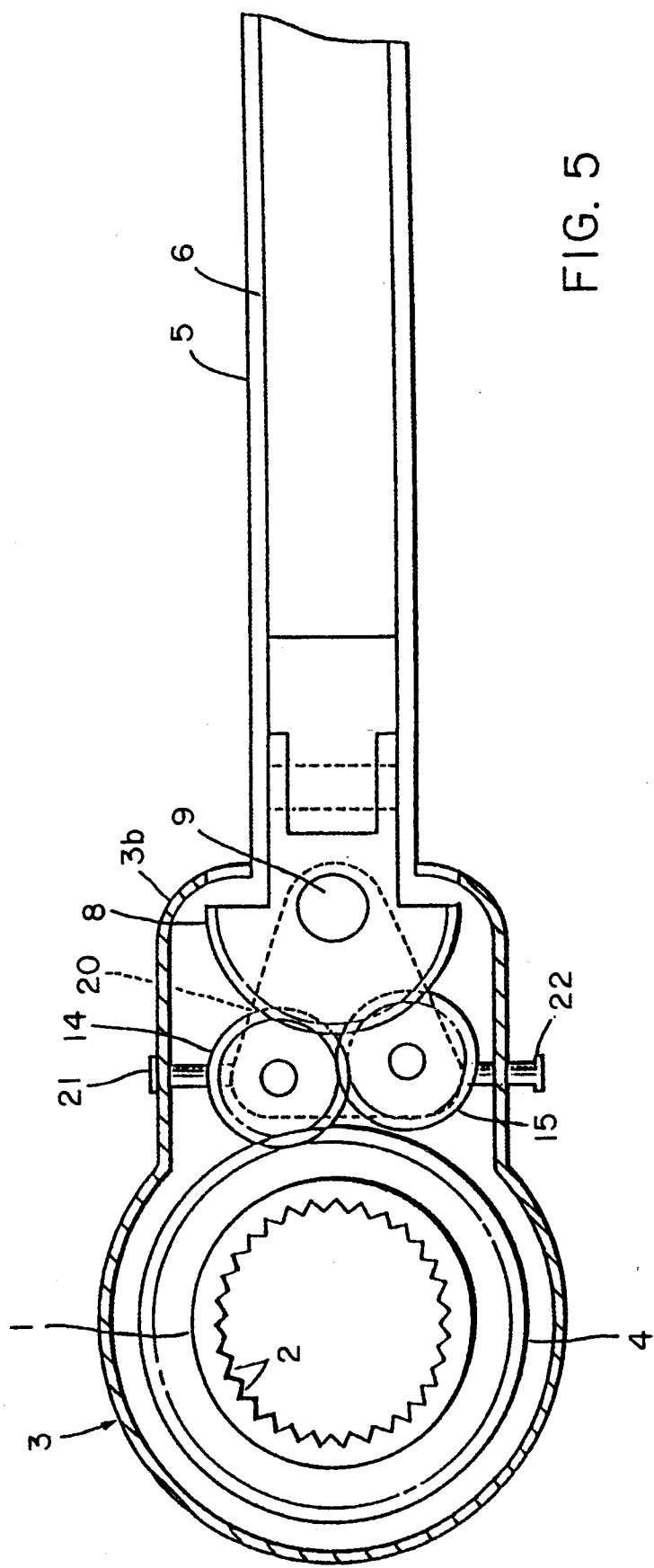
FIG. 5 is a plan view of the embodiment showing the right pin in its pushed position.

The triangle plate 20 has pins 21, 22 extending to the right and the left therefrom, and is moved pivotably by pushing the pins 21, 22 manually. When the left pin 22 is pushed into the square part 3b (as shown in FIG. 1), the triangle plate 20 is pivoted in the clockwise direction as seen in FIG. 1, which causes the left drive gear 15 to be engaged with the output shaft 4, and the right drive gear 14 to be disengaged from the output shaft 4. On the contrary, when the right pin 21 is pushed into the square part 3b (as shown in FIG. 5), the triangle plate 20 is pivoted in the counterclockwise direction as seen in FIG. 5, which causes the right drive gear 14 to be engaged with the output shaft 3, and the left drive gear 15 to be disengaged from the output shaft 4.

The right and the left drive gears 14, 15 are in engagement with each other, while the right and the left pinions 10, 11 are not in engagement with each other.

The rotary tool of this embodiment operates as follows. The description will be first given to fastening or loosening of a bolt or a nut by pivoting the lever 5 in the rotational direction of the output shaft 1 in the same manner as a conventional socket wrench. In this case, a suitable socket (not shown) is attached to the output shaft 1, and then the lever 5 and the grip 6 grasped together by hand are pivoted in the rotational direction of the output shaft 1. As shown in FIG. 1, when the left drive gear 15 is in engagement with the output gear 4, the output gear 4 cannot be rotated in which the clutch teeth 17, 19 of the drive gear 15 and the pinion 11, respectively, are engaged, which causes the output shaft 1 to be rotated along with the lever 5, thus fastening or loosening a bolt or a nut. When the lever 5 is pivoted in the opposite direction, the clutch teeth 17, 19 is idly rotated, which causes the output shaft 1 to be idly rotated even when the lever 5 is pivoted. Thus, when the lever 5 is pivoted, the rotary tool of the invention can be operated to fasten or loosen a bolt or a nut only in one direction by reciprocating pivotal movements of the lever 5 in the same manner as a conventional ratchet type socket wrench. When the right pin 21 is pushed, the right drive gear 14 and the right pinion 10 operates in the same manner as described above.

Now, the description will be given to the case that the lever 5 is not moved and only the grip 6 is reciprocatingly pivoted. In this case, as shown by phantom line in FIG. 2, the grip 6 may be lifted about the connecting bar 7 as an axis in order to easily grasp the grip 6. In this condition, the grip 6 is grasped by one hand and the lever 5 is grasped by the other hand, and the grip 6 is reciprocatingly pivoted right and left around the rotary shaft 9. The grip 6 is pivoted relative to the lever 5, that is, as shown in FIG. 3, the grip 6 and the lever 5 are opened and closed by hand like the handles of shears.

When the grip 6 is pivoted from the position in FIG. 1 to that of the FIG. 3 (this movement is hereinafter referred to as forward movement), the circular arcuate gear 8 as seen in FIG. 3 is rotated in the clockwise direction, so that the right and left pinions 10, 11 are rotated in the counterclockwise direction. At this time, the right pinion 10 is idly rotated since the clutch teeth 16, 18 are not engaged. On the other hand, the clutch teeth 17, 19 are engaged, and therefore, the left pinion 11 is rotated in the counterclockwise direction together with the left drive gear 15. The left drive gear 15 is in engagement with the output gear 4, and therefore, the output gear 4 is rotated in the clockwise direction, and the output shaft 1 is also rotated in the clockwise direction. It is to be noted that the left drive gear 15 idly rotates the right drive gear 14 in the clockwise direction.

When the grip 6 is pivoted from the position in FIG. 3 to that of the FIG. 1 (this movement is hereinafter referred to as reverse movement), the circular arcuate gear 8 as seen in FIG. 3 is rotated in the counterclockwise direction, so that the right and left pinions 10, 11 are rotated in the clockwise direction. At this time, the left pinion 11 is idly rotated since the clutch teeth 17, 19 are not engaged. On the other hand, the clutch teeth 16, 18 are engaged, and therefore, the right pinion 10 is rotated in the clockwise direction together with the right drive gear 14. The right drive gear 14 is out of engagement with the output gear 4, and therefore, as the right drive gear 14 is rotated in the clockwise direction, the left drive gear 15 is rotated in the counterclockwise direction. Then, as the left drive gear 15 is rotated, the output gear 4 is rotated in the clockwise direction, and the output shaft 1 is also rotated in the clockwise direction, as with the forward movement of the grip 6. The rotation of the left drive gear 15 does not act on the idle rotation of the pinion 11 located thereon. Thus, the output shaft 1 is continuously rotated in the same direction by reciprocating pivotal movements of the grip 6.

When the right pin 21 is pushed as seen in FIG. 5, the operation described above is reversed. The output shaft 1 is continuously rotated in the counterclockwise direction by reciprocating pivotal movements of the grip 6. In short, the rotational direction of the output shaft 1 can be changed by the pins 21, 22.

Specifically, when the right pin 21 is pushed and the grip 6 is moved forwardly, the clutch teeth 17, 19 of the drive gear 15 and the left pinion 11, respectively, are in engagement with each other, and the counterclockwise rotation of the left drive gear 15 rotates the right drive gear 14 in the clockwise direction. The clockwise rotation of the right drive gear 14, in turn, rotates the output gear 4 in the counterclockwise direction and the output shaft 1 as well in the counterclockwise direction.

When the grip 6 is moved reversely, the clutch teeth 16, 18 of the drive gear 14 and the right pinion 10, respectively, are in engagement with each other, and the clockwise rotation of the right drive gear 14 rotates the output gear 4 in the counterclockwise direction, thus rotating the output shaft 1 in the counterclockwise direction as well.

Although the above circular arcuate gear 8 has teeth on the outer periphery thereof, the circular arcuate gear 8 may be designed to have teeth on the inner periphery of an circular arcuate slot formed therein so as to engage the pinions 10, 11 in the slot.

In the above embodiment, although the mechanism of transmission from the pinions 10, 11 to the output shaft 1 has been described in relation to the use of the clutch teeth 16, 17, 18, 19, the drive gear 14, 15 and the output gear 4, other types of transmission mechanisms may be utilized. For example, intermediate transmission gears may be added, or pulleys and belts may be employed for transmission.

The mechanism described in claim 6 is provided by replacing the circular arcuate gear 8 in the present embodiment with an ordinary circular gear. This mechanism permits the output shaft to rotate in the same direction even in the cases that the circular gear rotates in any direction, for example, three times consecutively in one direction and then one time in the other, or indefinitely in one direction.

For example, the mechanism can be applied to a windmill. When a rotary motion in an opposite direction is inputted by ashift of wind, a rotary motion in the same direction can be outputted.

If applied to a bicycle, this mechanism permits the wheels as output means to rotate in the same direction even in the cases, for example, that the pedals as input means are rotated three times consecutively in one direction and then one time in the other, or indefinitely in one direction.

If the circular gear is used to be rotated by waves of the sea, and if the rotatinal direction of the circular gear varies with the direction of waves, rotary motions in the same direction can be outputted.

The mechanism of the present invention is applicable to rotary tools like screwdrivers as well as socket wrenches. Further, it is widely applicable to anything requiring rotational power, such as aircraft, ships, railways, automobiles, bicycles, construction machinery, heavy machinery, general machinery, generators, motors, business machines and medical instruments.

I claim:

1. A mechanism for converting a reciprocating arcuate motion into interrupted rotary motion in one direction comprising:

an arcuate gear segment provided for reciprocating arcuate motion about a pivot;
first and second pinions engaged with said arcuate gear and selectively engageable with an output shaft to provide rotary motion thereto;
first and second one-way clutch mechanisms provided in a motion transmission path from each of said pinions to said output shaft;
said first one-way clutch mechanism including means to rotate idly during movement of said arcuate gear in one direction, and the second one-way clutch mechanism including means to rotate idly during movement of said arcuate gear in the opposite direction; and
a motion transmission path from said two one-way clutch mechanisms to said output shaft including means such that said output shaft may be rotated in the same direction when either of said two one-way clutch mechanisms is engaged.

2. A rotary tool comprising:

an output gear having means for transmitting rotation to a work to be rotated;
a body rotatably supporting said output gear and having a lever portion formed on one end thereof;
a reciprocating pivotal member mounted on said body for pivotal motion about a pivot and having an arcuate gear portion on one end and a grip portion on the other end, said grip portion including means to develop reciprocating pivotal motion for said arcuate gear to convert reciprocating motion to unidirectional rotary motion;
first and second pinions mounted on said body and engaged with said arcuate gear; and
first and second one-way clutch mechanisms provided in a transmission path from said pinions to said output shaft;
said first one-way clutch mechanism including means to rotate idly during movement of said arcuate gear in one direction and said second one-way clutch mechanism including means to rotate idly during movement of said arcuate gear in the opposite direction; and wherein
the transmission path from said two one-way clutch mechanisms to said output shaft including means such that said output shaft may be rotated in the same direction when either of said two one-way clutch mechanisms is engaged.

3. The rotary tool as defined in claim 2 wherein:

said one-way clutch mechanisms and said transmission path from said one-way clutch mechanisms to said output gear comprises a first drive gear disposed coaxially with said first pinion, a first running face ratchet formed between said first pinion and said first drive gear, a second drive gear disposed coaxially with said second pinion and engaged with said first drive gear, and a second running face ratchet formed between said second pinion and said second drive gear and adapted to transmit rotation in the direction opposite to that of said first running face ratchet, said first drive gear being adapted to engage said output gear.

4. The rotary tool as defined in claim 3 wherein said first and said second drive gears can be selectively engaged with said output gear.

5. A ratchet type socket wrench wherein said rotation transmitting means of said output shaft in the rotary tool according to claim 2 is socket holder means for holding a socket for receiving a bolt or a nut.

6. A mechanism for converting a reciprocating arcuate motion into a rotary motion comprising:

a circular gear;
at least two pinions engaged with said circular gear;
an output shaft provided for rotary motion; and
two one-way clutch mechanisms provided in a transmission path from said pinions to said output shaft;
the first one-way clutch mechanism including means to rotate idly during movement in one direction of said circular gear, and the second one-way clutch mechanism including means to rotate idly during reverse movement of said circular gear; and
a transmission path from said two one-way clutch mechanisms to said output shaft including means such that the output shaft may be rotated in the same direction when either of said two one-way clutch mechanisms is engaged.

* * * * *